(12) United States Patent
Okumura

(10) Patent No.: US 7,609,960 B2
(45) Date of Patent: Oct. 27, 2009

(54) FINDER DEVICE AND CAMERA

(75) Inventor: Yoichiro Okumura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 499 days.

(21) Appl. No.: 11/443,649

(22) Filed: May 31, 2006

(65) Prior Publication Data

US 2006/0269273 A1 Nov. 30, 2006

(30) Foreign Application Priority Data

May 31, 2005 (JP) ............................. 2005-160622

(51) Int. Cl.
*G03B 17/20* (2006.01)
(52) U.S. Cl. ...................... 396/296; 348/341
(58) Field of Classification Search ................. 396/296; 348/341
See application file for complete search history.

(56) References Cited

U.S. PATENT DOCUMENTS

| | | | |
|---|---|---|---|
| 4,367,463 A * | 1/1983 | Suzuki et al. | 345/9 |
| 4,704,022 A | 11/1987 | Nozawa et al. | |
| 5,485,241 A * | 1/1996 | Irie et al. | 396/51 |
| 5,650,607 A * | 7/1997 | Kusaka | 250/201.8 |
| 5,659,823 A * | 8/1997 | Mukai et al. | 396/291 |
| 5,745,810 A * | 4/1998 | Matsushima | 396/289 |
| 6,393,216 B1 * | 5/2002 | Ootsuka et al. | 396/56 |
| 6,639,626 B1 | 10/2003 | Kubo et al. | |

2002/0191097 A1 12/2002 Kobayashi

FOREIGN PATENT DOCUMENTS

| | | |
|---|---|---|
| JP | 10-142685 | 5/1998 |
| JP | 2000-013661 | 1/2000 |
| JP | 2000-165730 | 6/2000 |
| JP | 2001-078069 | 3/2001 |
| JP | 2001-125173 | 5/2001 |
| JP | 2001-222059 | 8/2001 |
| JP | 2002-182268 | 6/2002 |
| JP | 2002-290780 | 10/2002 |
| JP | 2002-369042 | 12/2002 |
| JP | 2005-010643 | 1/2005 |
| JP | 2006-11025 | 1/2006 |

* cited by examiner

*Primary Examiner*—Melissa J Koval
*Assistant Examiner*—Fang-Chi Chang
(74) *Attorney, Agent, or Firm*—Straub and Pokotylo; John C. Pokotylo

(57) ABSTRACT

The present invention discloses a finder device and camera including the finder device having an information display device arranged near a mat screen on which a subject image is formed, and an imaging device for acquiring a finder image including the subject image on the mat screen. In this structure, the operation of the information display device is stopped in response to the imaging operation of the imaging device. This can prevent the subject image and the image displayed by the information display device from being difficult to see due to the difference between the brightness of the image on the mat screen and the brightness of the information display device. The information display device can be configured such that it superimposes, for example, shooting information and focus points on the image.

23 Claims, 9 Drawing Sheets

LIVE VIEW MODE (L MODE)

| | POWER ON | 1R BEING PRESSED (READY FOR SHOOTING) | 2R ON | FOR 8 SEC. AFTER 1R IS OFF |
|---|---|---|---|---|
| DISPLAY IN FINDER | OFF | ON<br>EXPOSURE INFORMATION | OFF | ON<br>EXPOSURE INFORMATION |
| BACKSIDE TFT DISPLAY | DEPTH OF FIELD VIEW OF IMAGE | EXPOSURE INFORMATION<br>+<br>DEPTH OF FIELD VIEW OF IMAGE | REC VIEW AFTER EXPOSURE | EXPOSURE INFORMATION<br>+<br>DEPTH OF FIELD VIEW OF IMAGE |

Fig. 6

FINDER MODE (F MODE)

| | POWER ON | 1R BEING PRESSED (READY FOR SHOOTING) | 2R ON | FOR 8 SEC. AFTER 1R IS OFF |
|---|---|---|---|---|
| DISPLAY IN FINDER | OFF | ON<br>EXPOSURE INFORMATION | OFF | ON<br>EXPOSURE INFORMATION |
| BACKSIDE TFT DISPLAY | EXPOSURE INFORMATION | OFF | REC VIEW AFTER EXPOSURE | OFF |

Fig. 7 though another image pickup device as described in the U.S. Pat. No. 4,704,022, there may be cases where the brightness of the display in the viewfinder does not fit the brightness of the subject.

FINDER DEVICE AND CAMERA

CROSS-REFERENCE TO RELATED APPLICATION

This application is based upon and claims the benefit of priority from prior Japanese Patent Application No. 2005-160, 622, filed on May 31, 2005, the entire contents of which are incorporated herein by reference.

BACKGROUND OF THE INVENTION

1. Field of the Invention

The present invention relates to a finder device. More particularly, the present invention relates to the improvement of a finder device in a digital camera capable of displaying on a display screen both an image being viewed and an image being shot.

2. Description of the Related Art

Digital cameras are commonly known, which form an optical image of a subject on an image pickup device from light coming from the subject and passing through a photographing optical system, photoelectrically convert the optical image into electric image signals through the image pickup device, and display the resulting image on the screen of an image display device, such as an LCD monitor, based on the electric image signals.

As an example of such a camera displaying a subject image, a camera is known in which a half mirror is arranged in a finder optical system to guide a light beam of a subject to an image pickup device for live-view display. In this case, the image pickup device repeats the imaging operation in a live view mode to cause a live-view display on the screen of a display device (for example, see Japanese Patent Laid-Open No. 2000-165730).

A technique is also known which uses another image pickup device to monitor a finder screen (for example, see the U.S. Pat. No. 4,704,022).

It is common practice for conventional single lens reflex cameras (hereinafter simply called "SLR cameras") to superimpose multiple focus points, shooting information, etc. on a subject image in a viewfinder.

However, the camera described in Japanese Patent Laid-Open No. 2000-165730 is not to display shooting information and a subject image at a time on the screen of a display device.

On the other hand, when a finder screen is monitored through another image pickup device as described in the U.S. Pat. No. 4,704,022, there may be cases where the brightness of the display in the viewfinder does not fit the brightness of the subject.

BRIEF SUMMARY OF THE INVENTION

The finder device or the camera of the present invention has an information display device arranged near a mat screen on which a subject image is formed and an imaging device for acquiring a finder image including the subject image on the mat screen. In this structure, the operation of the information display device is stopped in response to the imaging operation of the imaging device. This can prevent the subject image and the image displayed by the information display device from being difficult to see due to the difference between the brightness of the image on the mat screen and the brightness of the information display device.

The information display device can be configured such that the device superimposes, for example, shooting information and focus points on a display screen.

According to one aspect of the present invention, there is provided a finder device comprising: an information display device arranged near a mat screen; a finder optical system for allowing a user to optically observe a subject image on the mat screen and the display contents of the information display device; and an imaging device for acquiring a finder image including the subject image on the mat screen through an optical element that is a part of the finder optical system, wherein the information display device stops its information display operation in response to the imaging operation of the imaging device.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 6 is a table showing the correspondences between operations and display contents in the live view mode (L mode);

FIG. 7 is a table showing the correspondences between operations and display contents in the finder mode (F mode);

DETAILED DESCRIPTION OF THE PREFERRED EMBODIMENTS

A preferred embodiment of the invention is described below with reference to the accompanying drawings.

Figure 1:
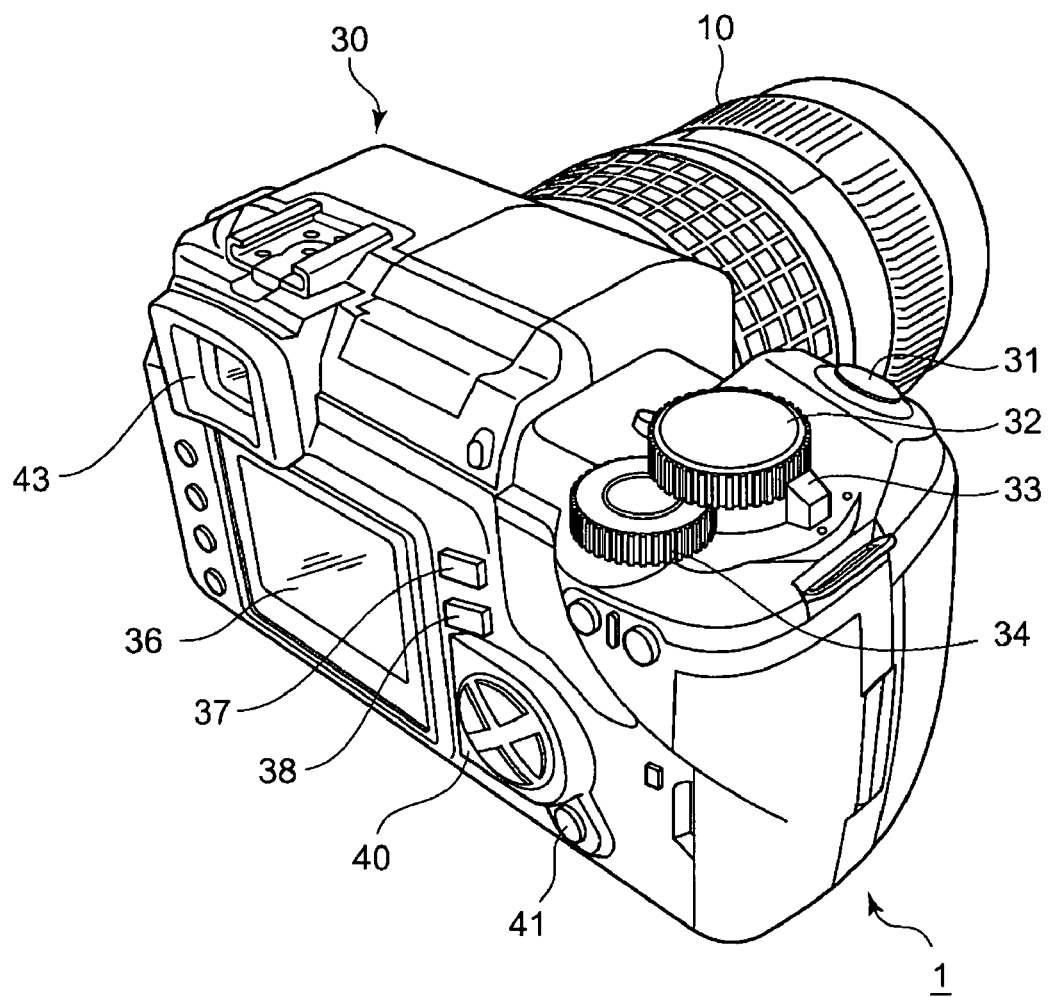
FIG. 1 is an outline perspective view showing the structure of a single-lens reflex digital camera to which a finder device according to a preferred embodiment of the present invention is applied.

FIG. 1 is an outline perspective view showing the structure of a single-lens reflex digital camera to which a finder device according to a preferred embodiment of the present invention is applied.

In FIG. 1, the single-lens reflex digital camera (hereinafter simply called the "camera") 1 consists principally of an interchangeable lens barrel 10 and a camera body 30. In this structure, a desired lens barrel 10 is removably mounted on the front of the camera body 30.

A shutter button 31, a mode dial 32, a power switch lever 33, a control dial 34, etc. are provided on the top face of the camera body 30.

The shutter button 31 is to perform shooting preparation and exposure operations. The shutter button 31 consists of two-step switches, namely a first shutter release switch and a second shutter release switch. When the shutter button 31 is pressed halfway, the first shutter release switch is turned on to perform shooting preparation operations, such as photometering and distance measuring. Then, when shutter button 31 is pressed fully, the second shutter release switch is turned on to make an exposure.

The mode dial 32 is an operation part for allowing a user to set a shooting mode upon shooting. The mode dial 32 is rotated in a predetermined direction to set a shooting mode upon shooting. In the embodiment, the mode dial 32 also has a function for switching over the image display in an LCD monitor between a finder mode and a live-view mode as described in detail later. The power switch lever 33 is an operation part for allowing the user to power on or off the camera 1. When the power switch lever 33 is moved, the main power supply of the camera 1 is turned on or off.

The control dial 34 is an operation part for allowing the user to set shooting information. The user can set various shooting conditions upon shooting by operating the control dial 34.

Further, an LCD monitor 36 for displaying a shooting image, a menu, etc., a playback button 37, a menu button 38, an arrow pad 40, an OK button 41, a viewfinder 43 in an eyepiece optical system, etc. are arranged on the back face of the camera body 30.

The playback button 37 is to switch over the camera 1 to a playback mode capable of playing back a JPEG image file recorded in a flash ROM 84 or on a recording medium 85 as described in detail later. The menu button 38 is to display a menu screen on the LCD monitor 36. The menu screen consists of menu items in a multi-layered structure. The user can select a desired menu item using the arrow pad 40 and confirm the selected item by pressing the OK button 41.

Figure 2:
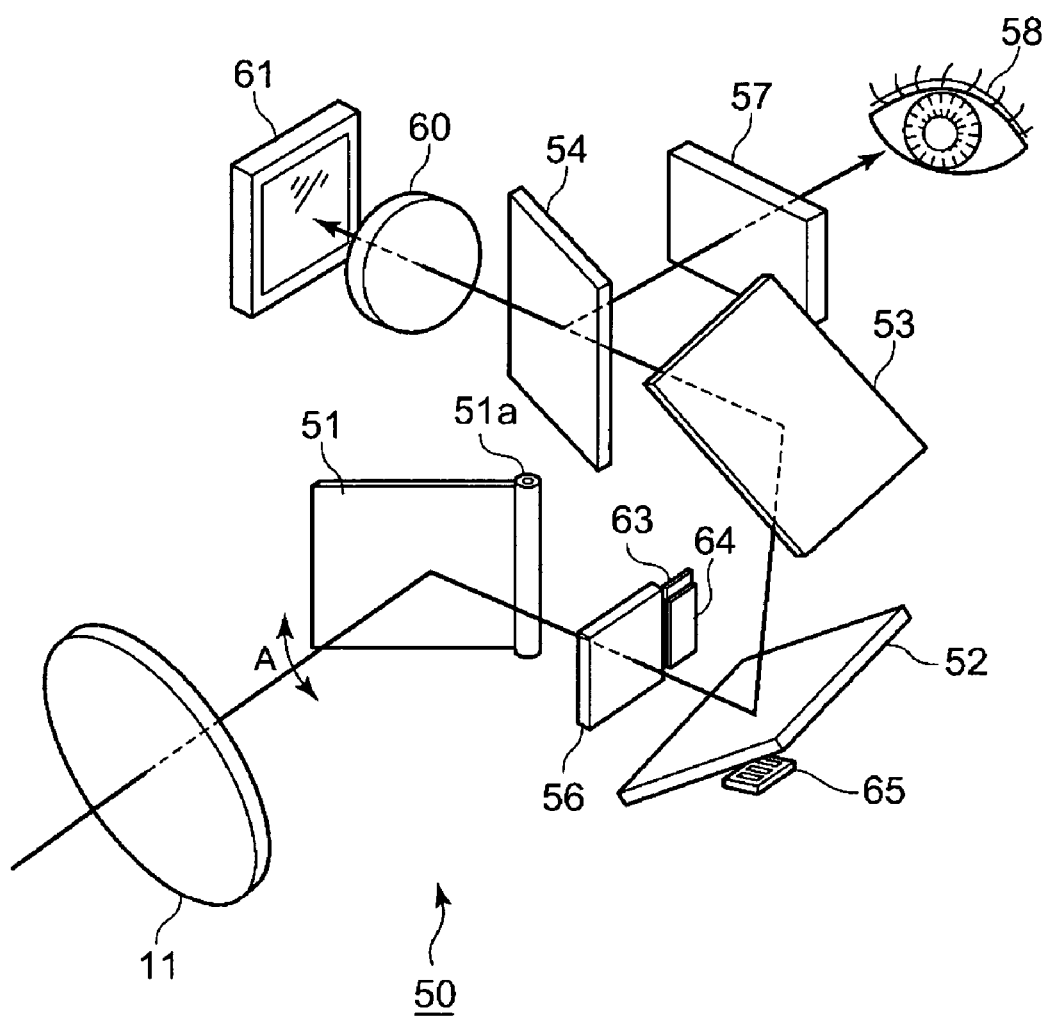
FIG. 2 is a perspective view showing the structure of a finder optical system of the camera according to the embodiment of the present invention.

FIG. 2 is a perspective view showing the structure of a finder optical system of the camera according to the embodiment of the present invention.

A finder optical system 50 consists principally of a plurality of mirrors for guiding a light beam coming from a subject and passing through a photographing lens 11 in the lens barrel 10 to an eyepiece lens 57 constituting part of the viewfinder 43, and a focusing screen (matt screen) 56, and the eyepiece lens 57. The plurality of mirrors include a first reflection mirror 51, a second reflection mirror 52, a third reflection mirror 53, and a fourth reflection mirror 54.

The first reflection mirror 51 is configured to be rotatable about an axis 51a in both directions indicated by arrow A in FIG. 2. Part of the first reflection mirror 51 is formed into a half mirror for an AF sensor unit to be described later. As shown, when a photographer is looking into the viewfinder 43 (FIG. 1) to observe a subject before shooting, the first reflection mirror 51 reflects a light beam incoming from the photographing lens 11 toward the second reflection mirror 52, at an angle of approximately 90° with respect to the optical axis of the photographing lens 11, that is, to the right in the camera body 30 as viewed from the lens barrel 10. Then, upon shooting, the first reflection mirror 51 is withdrawn out of the photographing optical path so that the light beam from the subject will be guided to an image pickup device (not shown) located behind the first reflection mirror 51.

The light beam reflected on the reflection surface of the first reflection mirror 51 is incident on the second reflection mirror 52 through the focusing screen 56. The second reflection mirror 52 is arranged along the optical axis of the reflected light from the first reflection mirror 51 and with its reflection surface tilted at a predetermined angle with respect to the optical axis of the reflected light from the first reflection mirror 51. In the embodiment, the light beam reflected from the first reflection mirror 51 and incident on the second reflection mirror 52 is reflected upward in the camera body 30 at an angle of approximately 90° with respect to the optical axis of the reflected light from the first reflection mirror 51.

The light beam reflected on the reflection surface of the second reflection mirror 52 is incident on the third reflection mirror 53 arranged along the reflective optical axis of the reflection surface of the second reflection mirror 52 and with its reflection surface tilted at a predetermined angle with respect to the reflective optical axis of the reflection surface of the second reflection mirror 52. In the embodiment, the light beam reflected from the second reflection mirror 52 and incident on the third reflection mirror 53 is reflected on the reflection surface of the third reflection mirror 53 at an angle of approximately 90° with respect to the reflective optical axis of the reflection surface of the second reflection mirror 52 in a direction opposite to the reflective direction of the reflection surface of the first reflection mirror 51. In other words, the light beam reflected from the reflection surface of the second reflection mirror 52 is reflected on the reflection surface of the third reflection mirror 53 to the left in the camera body 30. To sum up, the light beam reflected on the reflection surface of the first reflection mirror 51 is guided through the second and third reflection mirrors 52 and 53 as if it is turned back, and directed toward the fourth reflection mirror 54 because the reflective optical axis of the reflection surface of the third reflection mirror 53 is almost parallel to that of first reflection mirror 51.

The light beam reflected on the reflection surface of the third reflection mirror 53 is incident on the fourth reflection mirror 54 arranged along the reflective optical axis of the reflection surface of the third reflection mirror 53 and with its reflection surface tilted at a predetermined angle with respect to the reflective optical axis of the reflection surface of the third reflection mirror 53. In the embodiment, the light beam reflected from third reflection mirror 53 and incident on the fourth reflection mirror 54 is reflected on the reflection surface of the fourth reflection mirror 54 at an angle of approximately 90° with respect to the reflective optical axis of the reflected light from the third reflection mirror 53. In other words, the light beam reflected from the reflection surface of the fourth reflection mirror 54 is incident on the eyepiece lens 57 arranged on the reflective optical axis of the reflection surface of the fourth reflection mirror 54.

The focusing screen 56 has a diffusing surface for diffusing the light beam incident on it to form an optical image from the light beam incident in the finder optical system 50. The focusing screen 56 is arranged in a position optically equivalent to the imaging plane of an image pickup device 67 for capturing an image upon shooting as described later. Further, an LCD display panel 64 and a back light 63 for illuminating the LCD display panel 64 are provided adjacent to the focusing screen 56.

The second reflection mirror 52 and the fourth reflection mirror 54 are half mirrors. An AF point indicator 65 is arranged on the backside of the reflection surface of the second reflection mirror 52. The AF point indicator 65 is to cause a superimpose display to indicate where focus points are located on the screen in the viewfinder or the LCD monitor 36. On the other hand, an imaging lens 60 and an image pickup device 61 for producing a display image are provided on the backside of the reflection surface of the fourth reflection mirror 54. The image pickup device 61 for producing a display image (hereinafter simply called "for image display")

is to form an image on the focusing screen 56 through the imaging lens 60. Therefore, the image formed on the image pickup device 61 for image display is the same as that observed by a photographer's eye 58 except that the image formed on the image pickup device 61 is reversed left to right.

The light beam of the subject from the photographing lens 11 is guided to the eyepiece lens 57 through the first to fourth reflection mirrors 51-54 so that the image in the viewfinder 43 will be an erect-unreversed image. Thus, the subject image formed on the focusing screen 56 can be observed by the photographer's eye through the eyepiece lens 57 (viewfinder 43).

In the embodiment, the first reflection mirror 51, the second reflection mirror 52, the third reflection mirror 53, and the fourth reflection mirror 54 are all arranged to reflect the incident light beam at an angle of approximately 90°, but the present invention is not limited to this arrangement.

Figure 3:
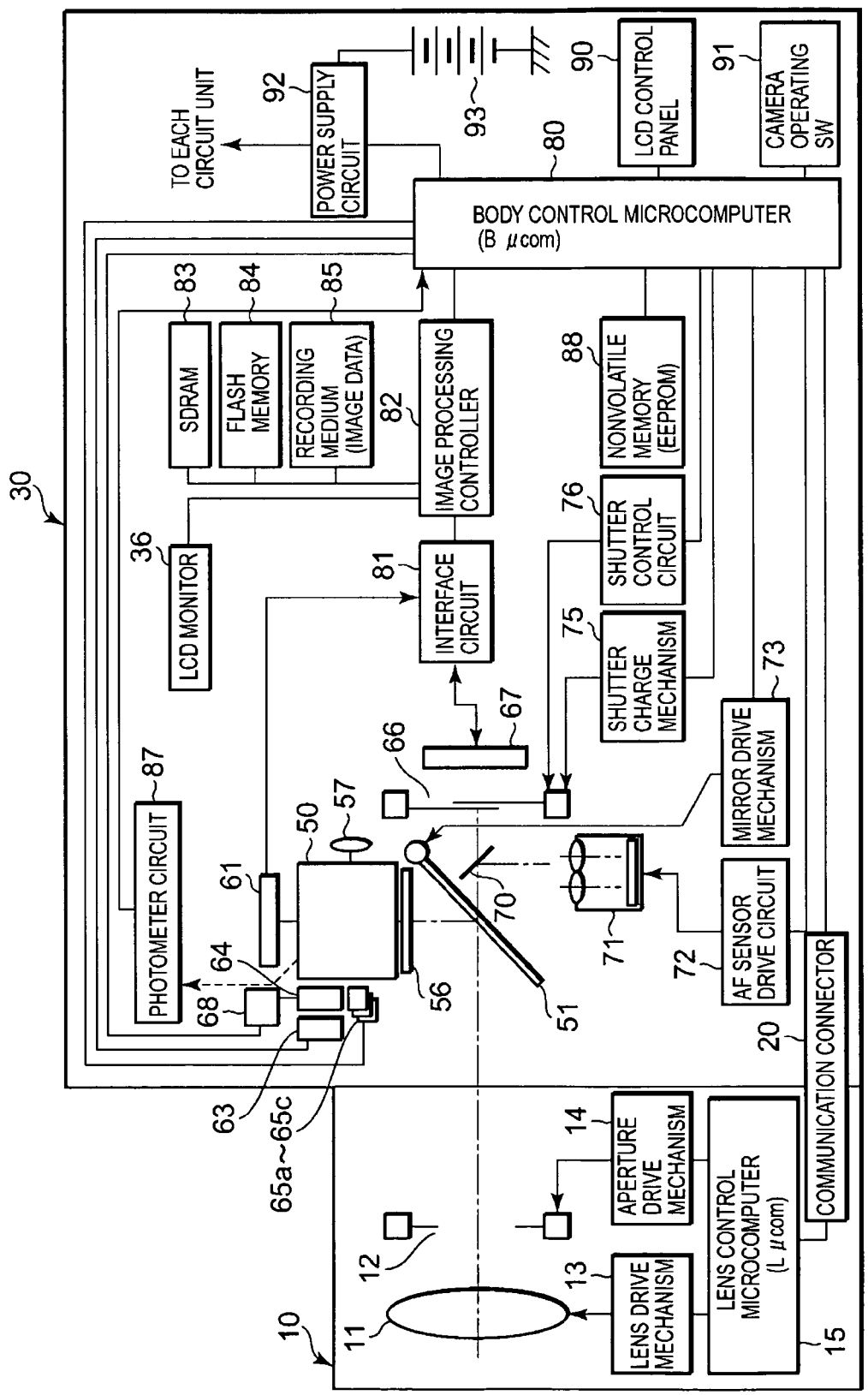
FIG. 3 is a block diagram showing a system configuration of the camera according to the embodiment of the present invention.

FIG. 3 is a block diagram showing a system configuration of the camera according to the embodiment of the present invention.

In FIG. 3, the lens barrel 10 is removablely mounted on the camera body 30 through a mount, not shown, provided on the front face of the camera body 30. The lens barrel 10 includes the photographing lens 11, an aperture 12, a lens drive mechanism 13, an aperture drive mechanism 14, and a lens control microcomputer (hereinafter abbreviated as "L μcom") 15.

The photographing lens 11 is driven along its optical axis by a DC motor (not shown) provided in the lens drive mechanism 13. The aperture 12 is driven by a stepping motor (not shown) provided in the aperture drive mechanism 14. The L μcom 15 controls each component in the lens barrel 10, such as the lens drive mechanism 13 and the aperture drive mechanism 14. The L μcom 15 is electrically connected to a body control microcomputer (hereinafter abbreviated as "B μcom") 80 to be described later so that it is controlled in accordance with instructions from the B μcom 80.

The camera body 30 is configured as follows.

A light beam from a subject, not shown, passing through the photographing lens 11 and the aperture 12 in the lens barrel 10 is reflected by the first reflection mirror 51 as a movable mirror, incidents on the focusing screen 56, and is guided to the eyepiece lens 57 through the second to fourth reflection mirrors 52-54 (see FIG. 2) constituting part of the finder optical system 50 together with the first reflection mirror 51. On the other hand, part of the light beam from the subject passes through the half mirror portion of the first reflection mirror 51, is reflected by a sub-mirror 70 movable independently of the first reflection mirror 51, and is guided to an AF sensor unit 71 for automatic distance measurement. In FIG. 3, although the first reflection mirror 51 is shown separately from the second to fourth reflection mirrors, it constitutes part of the finder optical system 50 together with the second to fourth reflection mirrors.

A focal-plane type shutter 66 and the image pickup device 67 for capturing an image upon shooting (hereinafter simply called "for image capturing") are provided behind the first reflection mirror 51 along the optical axis. The image pickup device 67 for image capturing is a photoelectric converter in an imaging optical system, such as a CCD, for photoelectrical conversion of light from a subject passing through the optical system to produce a subject image. In other words, when the first reflection mirror 51 is withdrawn out of the optical path, the light beam passing through the photographing lens 11 and the aperture 12 forms an image on the imaging plane of the image pickup device 67 for image capturing.

The LCD display panel 64 and the back light 63 are arranged near the focusing screen 56. The LCD display panel 64 is driven by an LCD driver 68, and controlled together with the back light 63 in accordance with instructions from the B μcom 80 to be described later.

Further, as mentioned above, the finder optical system 50 is configured such that elements constituting the AF point indicator 65, for example, three-color LEDs 65a-65c, are arranged near the second reflection mirror 52, and the image pickup device 61 for image display is arranged near the fourth reflection mirror 54. Together with the LCD display panel 64 and the back light 63, the LEDs 65a-65c are connected to the B μcom 80 and controlled in accordance with instructions from the B μcom 80.

The image pickup device 61 for image display and the image pickup device 67 for image capturing are connected to an image processing controller 82 for image processing through an interface circuit 81. The LCD monitor 36 is also connected to the image processing controller 82. An SDRAM 83, the flash memory 84, the recording medium 85, etc. as memory areas are further connected to the image processing controller 82. The LCD monitor 36 and these memory areas are configured to allow the camera to provide an electronic recording/display function as well as an electronic imaging function.

The recording medium 85 is an external recording medium such as one of various types of memory cards removably inserted into the camera body 30 through a camera interface, not shown, or an external hard disk drive (HDD).

The image processing controller 82 is connected to the B μcom 80 for controlling each component of the camera body 30. A photometer circuit 87 including a photometric sensor, not shown, an AF sensor drive circuit 72, a mirror drive mechanism 73, a shutter charge mechanism 75, a shutter control circuit 76, and a nonvolatile memory (EEPROM) 88 are also connected to the B μcom 80.

An LCD control panel 90 for providing a display screen to the photographer to show the operating state of the camera, a camera operating-switch part (SW) 91, and a battery 93 through a power supply circuit 92 are further connected to the B μcom 80.

The B μcom 80 and the L μcom 15 are electrically connected through a communication connector 20 when the lens barrel 10 is mounted on the camera body 30. The L μcom 15 cooperates dependently with the B μcom 80 to operate in the digital camera.

The AF sensor drive circuit 72 is to control the drive of the AF sensor unit 71, and the mirror drive mechanism 73 is to control the drive of the first reflection mirror 51. The shutter charge mechanism 75 is to charge a spring for driving front and rear curtains, not shown, constituting the shutter 66. The shutter control circuit 76 not only controls the traveling of the front and rear curtains of the shutter 66, but also exchanges with the B μcom 80 a signal for controlling the opening/closing of the shutter and a signal synchronizing with the firing of an electronic flash. The photometer circuit 87 performs photometric processing based on an electric signal from the photometric sensor.

The nonvolatile memory 88 is a memory storing control parameters necessary for control of the camera as a storage area other than the SDRAM 83, the flash memory 84, and the recording medium 85. The nonvolatile memory 88 is provided accessible from the B μcom 80.

The LCD control panel 90 is to provide a display screen to the photographer to show the operating state of the camera. The camera operating-switch part 91 is a group of switches including operation buttons necessary to operate the camera such as the shutter release switches, a mode change switch, a power switch, etc. The second shutter release switch in the shutter release switches is not only to instruct shooting but also to switch the position of the first reflection mirror 51 between the inside and outside of the shooting optical path. The mode change switch is to switch over between the shooting mode and an image display mode. The power supply circuit 92 is provided for converting the voltage of the battery 93 as a power source and supplying a voltage necessary for each circuit unit of the camera system.

Figure 4:
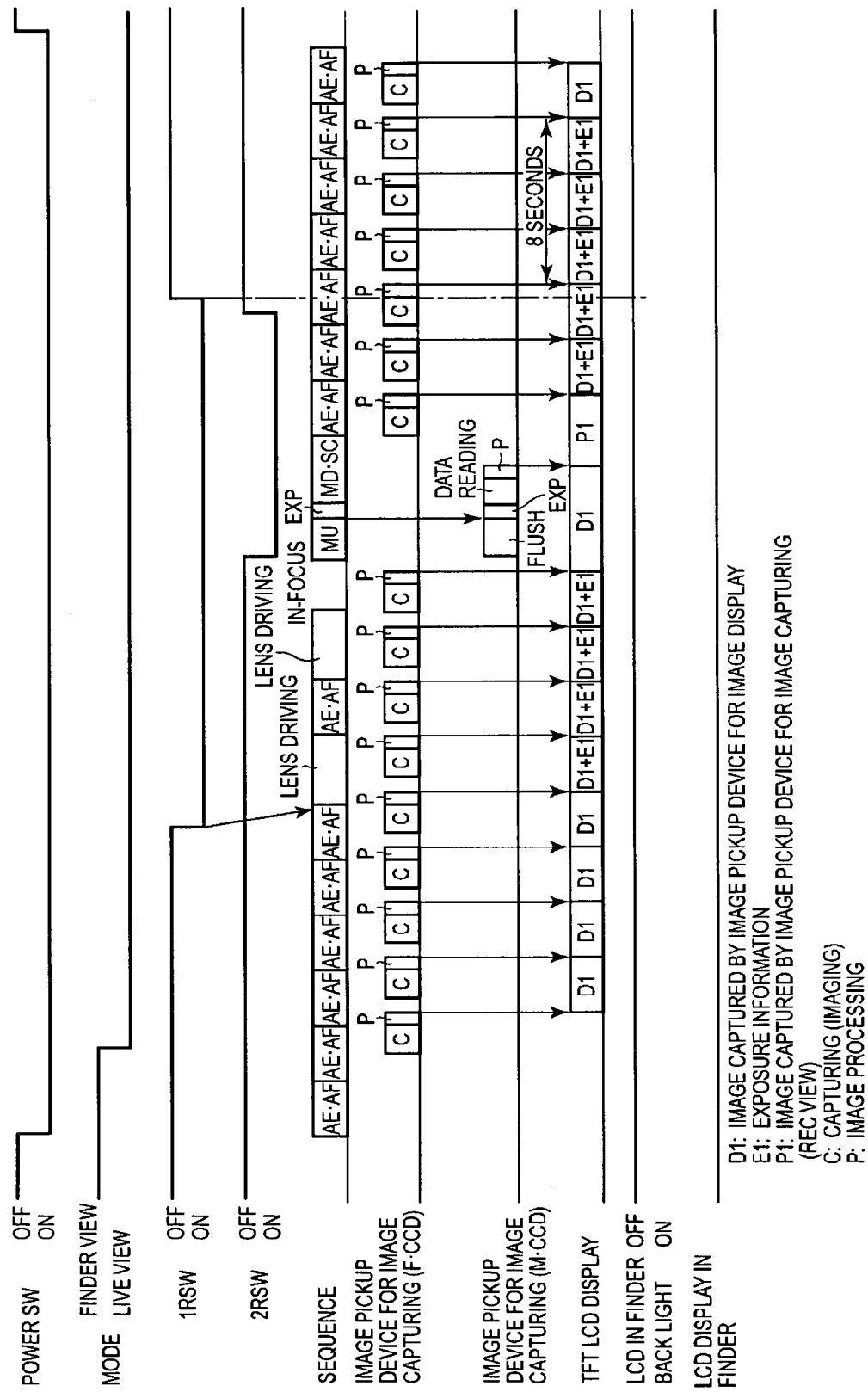
FIG. 4 is a timing chart for explaining the operation of the camera in a live view mode according to the embodiment of the present invention.
Figure 5:
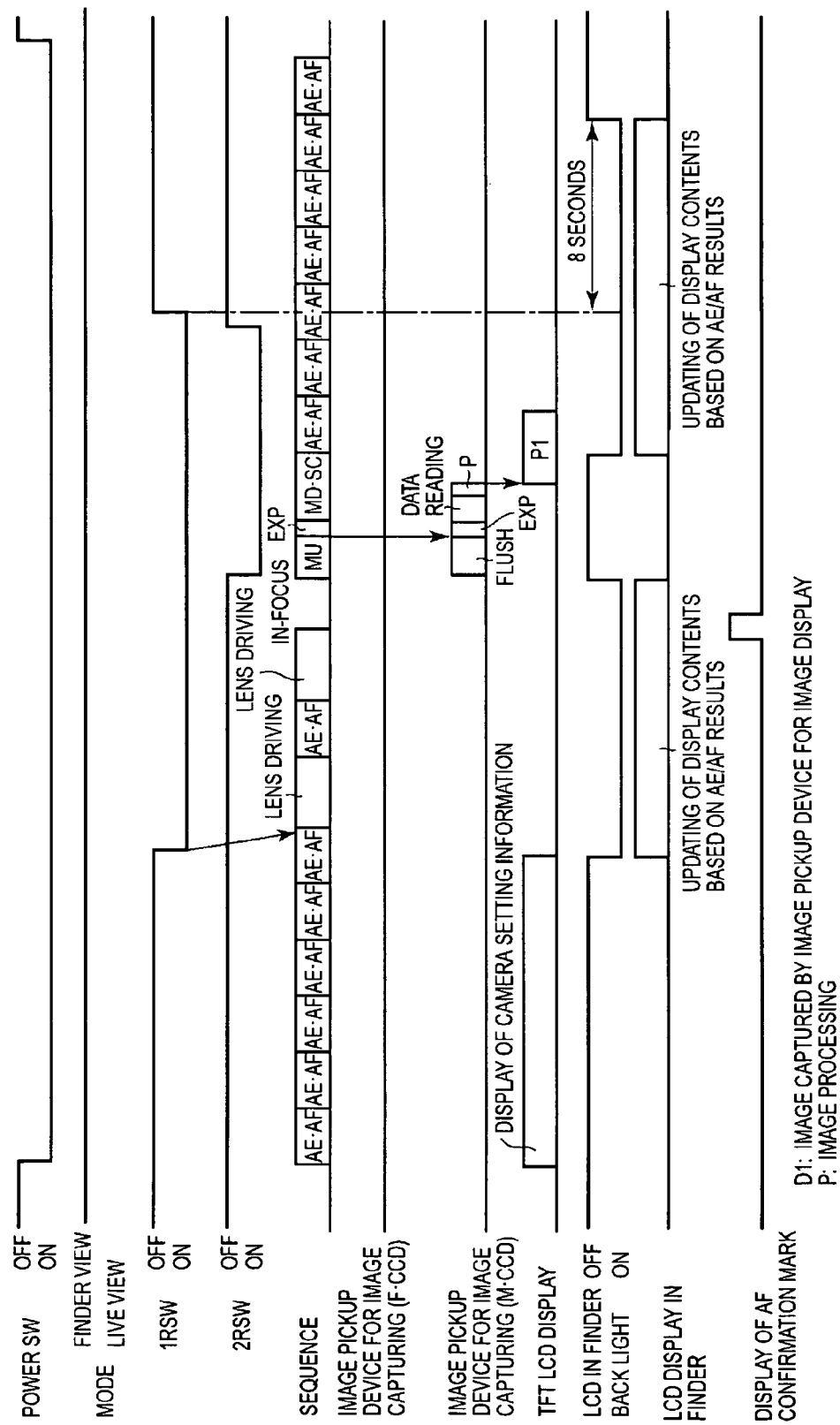
FIG. 5 is a timing chart for explaining the operation of the camera in a finder mode according to the embodiment of the present invention.

The following describes the basic shooting operation of the camera according to the embodiment of the present invention with reference to timing charts of FIGS. 4 and 5, and tables of FIGS. 6 and 7 showing the correspondences between operations and display contents in each mode.

FIG. 4 is a timing chart for explaining the operation of the camera in the live view mode according to the embodiment of the present invention. FIG. 5 is a timing chart for explaining the operation of the camera in the finder mode according to the embodiment of the present invention. In the timing charts of FIGS. 4 and 5, AE denotes automatic exposure, AF is auto focus, EXP is an actual exposure, MU and MD are the withdrawal and recovery of the first reflection mirror 51, SC is shutter charge, E1 is exposure information, C is image capturing (imaging), P is image processing, P1 is an image captured by the image pickup device 67 for image capturing, D1 is an image captured by the image pickup device 61 for image display, respectively. FIG. 6 is a table showing the correspondences between operations and display contents in the live view mode (L mode). FIG. 7 is a table showing the correspondences between operations and display contents in the finder mode (F mode).

The shooting operation in the live view mode will first be described.

When the power switch lever 33 is operated to power on the camera 1, the photometric sensor and the AF sensor unit 71 repeat an AE and AF sequence at predetermined intervals. Then, when the mode dial 32 is operated at predetermined timing to switch over to the live view mode, the image pickup device 61 for image display starts operating so that a captured image will be processed and displayed on the LCD monitor 36 as an image of the subject and its background. After that, this sequence of operations is repeated. Note that the LCD display panel 64 in the viewfinder remains off during the sequence.

Then, when the shutter button 31 is pressed halfway to turn on the first shutter release switch (1RSW), the camera 1 starts the shooting preparation operation. In other words, the photographing lens 11 is driven to focus on the subject. Then, the camera 1 remains in this condition until the shutter button 31 is fully pressed to turn on the second shutter release switch (2RSW). During this period, the image (the image of subject and its background) captured by the image pickup device 61 for image display, and the exposure information are displayed on the LCD monitor 36, whereas the LCD display panel 64 remains off.

After that, when the second shutter release switch is turned on, the first reflection mirror 51 is withdrawn out of the shooting optical path and the aperture is narrowed to fit the image capturing. At the same time, the electric charge is flushed from the image pickup device 67 for image capturing. After completion of the actual exposure (image capturing with the image pickup device 67), data of the image captured is read and processed. During data reading and image processing, only the image captured by the image pickup device 61 for image display appears on the LCD monitor 36. Then, after completion of the image processing, the image actually captured by the image pickup device 67 for image capturing (Rec. View) appears on the LCD monitor 36 for a predetermined period of time. During this period, the LCD display panel 64 remains off.

On the other hand, after completion of the actual exposure, the first reflection mirror 51 is returned to the shooting optical path, and the shutter charge mechanism 75 charges the shutter. Then, after the shutter is charged, the AE and AF sequence can be repeated again at predetermined intervals. Along with the restart of the AE and AF sequence, the image pickup device 61 for image display starts operating again so that the next captured image will be processed and displayed on the LCD monitor 36 as the image of the subject and its background. After that, this sequence of operations is repeated. Note again that the LCD display panel 64 in the viewfinder remains off during the operation of the image pickup device 61.

After that, when a predetermined period of time has passed, the image captured by the image pickup device 61 for image display and the exposure information are displayed on the LCD monitor 36. At this time, when the second shutter release switch and the first shutter release switch are turned off, the image captured by the image pickup device 61 for image display and the exposure information remain displayed on the LCD monitor 36 for a predetermined period of time after the first shutter release switch is turned off, that is, for eight seconds in the embodiment. Then, after the lapse of eight seconds, the exposure information disappears, and only the image captured by the image pickup device 61 for image display remains displayed on the LCD monitor 36.

Thus, the LCD display panel 64 and the back light 63 in the viewfinder remain off at any timing of shooting in the live view mode.

The shooting operation in the finder view mode will next be described.

When the power switch lever 33 is operated to power on the camera 1, the photometric sensor and the AF sensor unit 71 repeat the AE and AF sequence at predetermined intervals. During this repetition, exposure information is displayed on the LCD monitor 36 provided on the back face of the camera body 30, while the LCD display panel 64 in the viewfinder remains off. Then, when the shutter button 31 is pressed halfway at predetermined timing to turn on the first shutter release switch, the camera 1 starts the shooting preparation operation. In other words, the photographing lens 11 is driven to focus on a subject. When the photographing lens 11 comes to the focus range, the LCD display panel 64 and the back light 63 are turned on to display the exposure information in the viewfinder. Then, the camera 1 remains in this condition until the shutter button 31 is fully pressed to turn on the second shutter release switch (2RSW) During this shooting preparation operation, nothing appears on the LCD monitor 36.

After that, when the second shutter release switch is turned on, the first reflection mirror 51 is withdrawn out of the shooting optical path, and the aperture drive mechanism 14 narrows the aperture. At the same time, the electric charge is flushed from the image pickup device 67 for image capturing. Then, the shutter control circuit 76 controls the traveling of the front and rear curtains of the focal-plane shutter 66 to make an actual exposure. After completion of the actual exposure, data of an image captured is read and processed. On the other hand, the first reflection mirror 51 is returned to the shooting optical path after the exposure, and the shutter charge mechanism 75 charges the shutter. Nothing appears oh the LCD monitor 36 until completion of the image processing following the shooting preparation operation. Then, after the completion of the image processing, the image actually captured by the image pickup device 67 for image capturing (Rec. View) appears on the LCD monitor 36 for a predetermined period of time.

On the other hand, when the second shutter release switch is turned on, the LCD display panel 64 and the back light 63 are turned off. After that, when the AE and AF sequence is repeated again at predetermined intervals, the LCD display panel 64 and the back light 63 are turned on to display exposure information. At this time, when the second shutter release switch and the first shutter release switch are turned off, the LCD display panel 64 and the back light 63 remain on for a predetermined period of time after the first shutter release switch is turned off, that is, for eight seconds in the embodiment. Then, after the lapse of eight seconds, the LCD display panel 64 and the back light 63 are turned off.

Thus, in the finder view mode, the display in the viewfinder is made only during the shooting waiting status in which the first shutter release switch is kept turned on and the predetermined period of time after the first shutter release switch is turned off.

Figure 8:
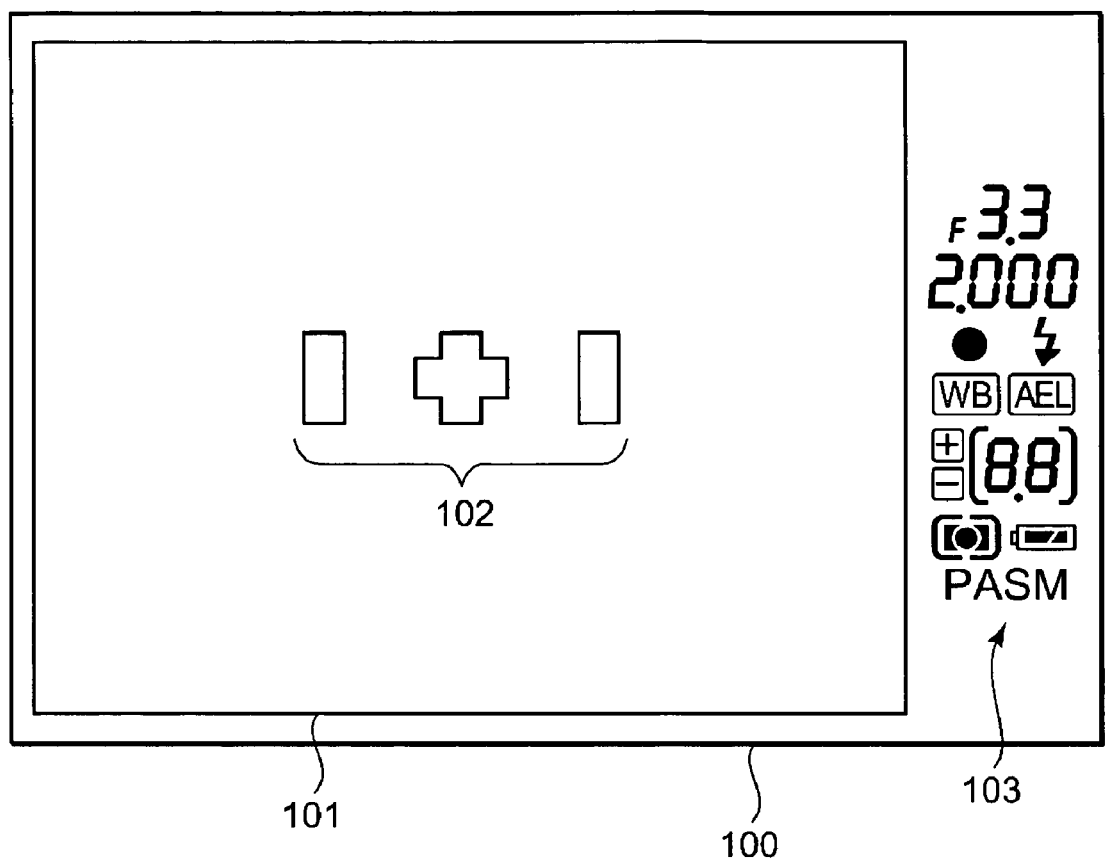
FIG. 8 shows an example of a display screen in an LCD monitor 36 in the live view mode.

FIG. 8 shows an example of a display screen in the LCD monitor 36 in the live view mode.

In FIG. 8, the display screen 100 appearing in the LCD monitor 36 consists of an image 101 captured by the image pickup device 67 for image capturing, an AF frame indicator part 102, and various kinds of shooting information 103.

Figure 9A:
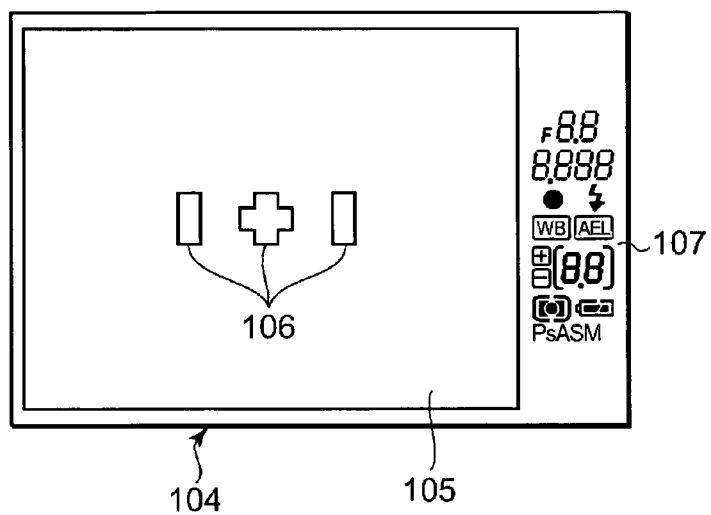
FIG. 9A shows an example of a display screen 104 in a viewfinder, in which the display screen 104 corresponds to a focusing screen 56.
Figure 9B:
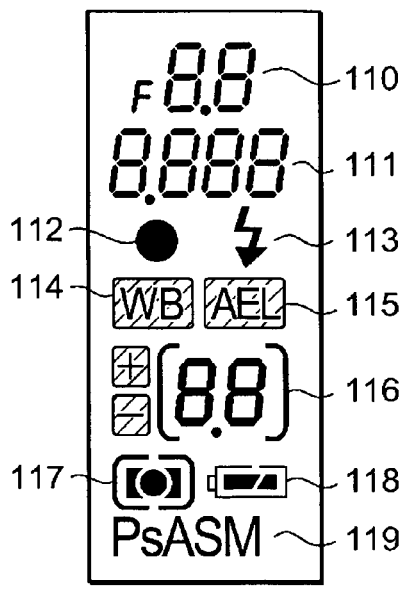
FIG. 9B shows a display example of an LCD display panel 64 that can be viewed in the viewfinder.

FIG. 9A shows an example of a display screen 104 in the viewfinder, in which the display screen 104 corresponds to the focusing screen 56. FIG. 9B shows a display example of the LCD display panel 64 that can be viewed in the viewfinder.

As shown in FIG. 9A, the display screen 104 is a combined screen consisting of a display part 105 for displaying an image captured by the image pickup device 61 for image display and a display part 107 for displaying shooting information appearing on LCD display panel 64. AF frames 106 used for AF appear almost in the central portion of the display part 105. On the other hand, as shown in FIG. 9B, marks indicating various kinds of shooting information appear in the display part 107.

In FIG. 9B, reference numeral 110 denotes a mark indicating an aperture value, 111 is a mark indicating a shutter speed, 112 is an AF confirmation mark indicating that the subject is in-focus, 113 is a flash mark, 114 is a white balance mark, 115 is an AE lock mark, 116 is a mark indicating an exposure compensation value, 117 is a mark indicating an metering mode, 118 is a battery check mark indicating the amount of power remaining in the battery, and 119 is a mark indicating an exposure mode.

In the live view mode, a display screen corresponding to these display parts 105 and 107 appears in the LCD monitor 36 as shown in FIG. 8, that is, the image 101 and the shooting information 103 appear on the screen 100 in the LCD monitor 36.

Figure 10:
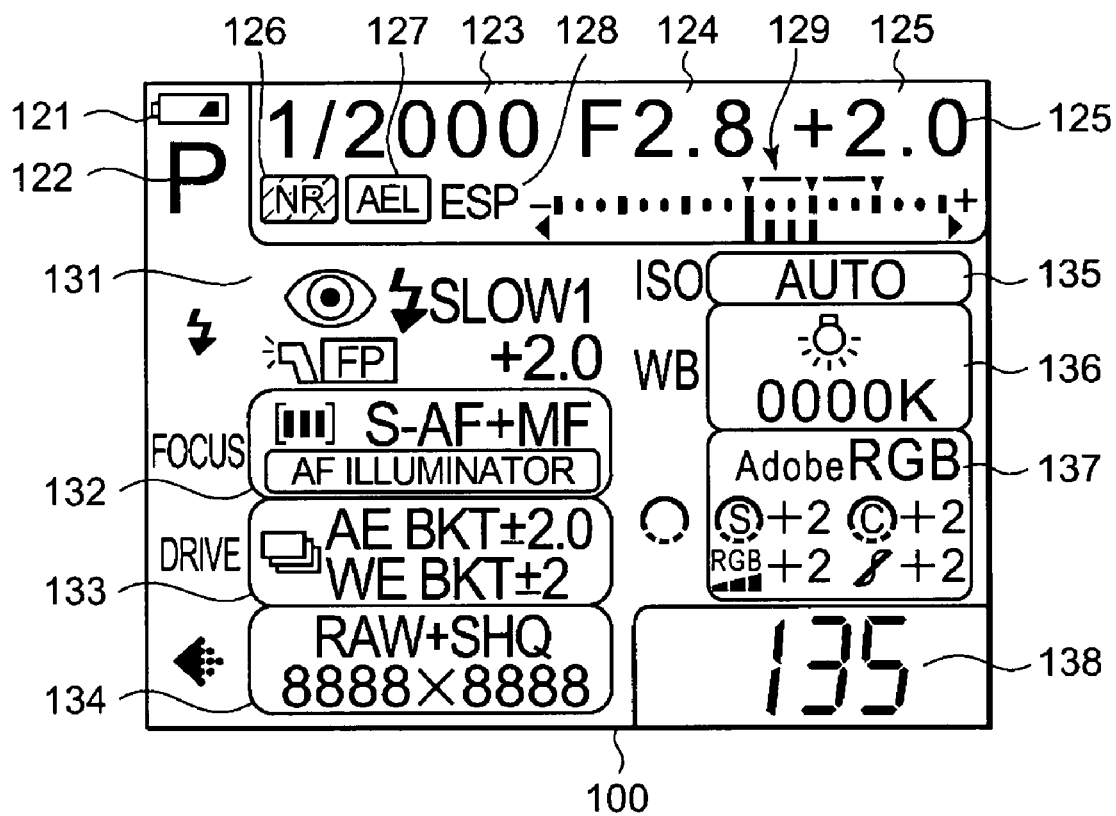
FIG. 10 shows a display example in which only exposure information is displayed in the LCD monitor 36.

FIG. 10 shows a display example in which only the exposure information is displayed in the LCD monitor 36.

In FIG. 10, reference numeral 121 denotes a battery check mark, 122 is a mark indicating an exposure mode, 123 is a mark indicating a shutter speed, 124 is a mark indicating an aperture value, 125 is a mark indicating an exposure compensation value, 126 is a noise reduction (noise removal) mark, 127 is an AE lock mark, 128 is a mark indicating a metering mode, and 129 is a part for an exposure compensation indicator and an exposure level indicator. Further, 131 is a part for indicating a flash mode and the like, 132 is a part for indicating an AF frame(s), 133 is a part for indicating a drive mode and the like, 134 is a part for indicating an image quality mode (record mode and pixel count) and the like, 135 is a mark indicating an ISO-equivalent sensitivity, 136 is a white balance mark, 137 is a part for indicating color settings and the like, and 138 is a mark indicating the remaining number of capturable pictures.

As described above, when an image on the focusing screen 56 is captured by the image pickup device 61 for image display, the image is captured under the condition that the display information on the LCD display panel 64 is turned off. Then, when the captured image is displayed on the LCD monitor 36, the captured image is combined with the information to be displayed on the LCD display panel 64 in a manner similar to the image screen observable in the viewfinder. This can prevent the shooting image display and the shooting information display from being difficult to see.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A finder device comprising:
a mat screen on which a subject image is formed;
an information display device arranged adjacent to the mat screen;
a finder optical system for allowing a user to optically observe the subject image on the mat screen and the display contents of the information display device; and
an imaging device for acquiring a finder image including the subject image on the mat screen through at least an optical element that is part of the finder optical system,
wherein the information display device stops its information display operation during the imaging operation of the imaging device.

2. The finder device according to claim 1 wherein the information display device includes a light emitting device for emitting light on the mat screen to cause a superimpose display.

3. The finder device according to claim 1 wherein the information display device includes an LCD display device located adjacent to the mat screen and a back light device for illuminating the LCD display device.

4. The finder device according to claim 1 wherein the information display device is a display device for displaying shooting information.

5. The finder device according to claim 1 wherein the information display device is a display device for displaying a focus point.

6. The finder device according to claim 1, further comprising an image display device for displaying the finder image acquired by the imaging device.

7. The finder device according to claim 6 wherein the image display device superimposes the display contents of the information display device on the image of the finder.

8. The finder device according to claim 6 wherein the image display device displays an image made similar to the finder image observable through the finder optical system.

9. A camera comprising the finder device according to claim 1.

10. A finder device comprising:
a mat screen on which a subject image is formed;

an information display device, arranged adjacent to the mat screen, for causing a superimpose display on the mat screen;

a finder optical system for allowing a user to optically observe the subject image on the mat screen; and an imaging device for acquiring a finder image including the subject image on the mat screen through at least an optical element that is a part of the finder optical system, wherein the information display device does not perform information display operation during the imaging operation of the imaging device.

11. The finder device according to claim 10 wherein the information display device includes a light emitting device for emitting light on the mat screen.

12. The finder device according to claim 10 wherein the information display device is a display device for displaying a focus point.

13. The finder device according to claim 10 further comprising an image display device for displaying the finder image acquired by the imaging device.

14. The finder device according to claim 13 wherein the image display device superimposes on the finder image an image made similar to the image superimposed by the information display device.

15. A camera comprising the finder device according to claim 10.

16. A camera comprising:

a mat screen on which a subject image is formed;

an information display device arranged on or adjacent to the mat screen;

an imaging device for capturing a finder image including the subject image on the mat screen, and a control part for controlling the information display device not to cause a display while the imaging device is performing the imaging operation.

17. The camera according to claim 16, further comprising an image display device for displaying an image captured by the imaging device.

18. The camera according to claim 16, further comprising a finder optical system for allowing a user to observe the subject image on the mat screen and the display contents of the information display device.

19. The camera according to claim 16 wherein the information display device includes a projection device for projecting an image on the mat screen to cause a superimpose display, and the control part controls the projection device to be turned off during the imaging operation.

20. The camera according to claim 16 wherein the information display device includes an LCD display device located adjacent to the mat screen and a back light device for illuminating the LCD display device, and the control part controls the back light device to be turned off during the imaging operation.

21. The camera according to claim 16 wherein the information display device displays a focus point or shooting information.

22. The camera according to claim 18 wherein the information display device combines the finder image with information to be displayed by the information display device and displays the combined image.

23. The camera according to claim 22 wherein the image display device displays an image made similar to the finder image observable through the finder optical system.

* * * * *